US007905682B2

(12) United States Patent
Holl et al.

(10) Patent No.: US 7,905,682 B2
(45) Date of Patent: Mar. 15, 2011

(54) ROAD MILLING MACHINE WITH OPTIMIZED OPERATION

(75) Inventors: Bernd Holl, Neustadt-Borscheid (DE); Kay Heemann, Bad Honnef (DE); Günter Hähn, Königswinter (DE); Axel Mahlberg, Hennef (DE)

(73) Assignee: Wirtgen GmbH, Windhagen (DE)

( * ) Notice: Subject to any disclaimer, the term of this patent is extended or adjusted under 35 U.S.C. 154(b) by 0 days.

(21) Appl. No.: 12/176,813

(22) Filed: Jul. 21, 2008

(65) Prior Publication Data

US 2009/0035064 A1 Feb. 5, 2009

Related U.S. Application Data

(63) Continuation of application No. 10/502,995, filed as application No. PCT/EP02/11675 on Oct. 18, 2002, now Pat. No. 7,422,391.

(30) Foreign Application Priority Data

Jan. 30, 2002 (DE) .................................. 102 03 732

(51) Int. Cl.
*B23Q 17/09* (2006.01)

(52) U.S. Cl. ............... 404/94; 404/75; 404/93; 404/122

(58) Field of Classification Search .................... 404/75, 404/83–86, 90, 92–94
See application file for complete search history.

(56) References Cited

U.S. PATENT DOCUMENTS

| | | | | |
|---|---|---|---|---|
| 3,596,577 | A * | 8/1971 | Chennells | 404/90 |
| 4,120,196 | A * | 10/1978 | Hamilton et al. | 73/104 |
| 4,140,420 | A | 2/1979 | Swisher, Jr. et al. | |
| 4,213,719 | A | 7/1980 | Swisher, Jr. et al. | |
| 4,591,209 | A | 5/1986 | Dröscher et al. | |
| 4,655,634 | A | 4/1987 | Loy et al. | |
| 4,744,242 | A * | 5/1988 | Anderson et al. | 73/104 |
| 4,894,644 | A * | 1/1990 | Thomas | 340/680 |
| 4,929,121 | A * | 5/1990 | Lent et al. | 404/84.05 |
| 5,318,378 | A | 6/1994 | Lent | |
| 5,533,790 | A | 7/1996 | Weiland | |
| 5,607,205 | A | 3/1997 | Burdick et al. | |
| 5,879,056 | A | 3/1999 | Breidenbach | |
| 5,893,677 | A | 4/1999 | Haehn et al. | |
| 6,152,648 | A | 11/2000 | Gfroerer et al. | |
| 6,371,566 | B1 | 4/2002 | Haehn | |
| 6,752,567 | B2 | 6/2004 | Miyamoto et al. | |
| 7,223,049 | B2 * | 5/2007 | Hall et al. | 404/93 |

FOREIGN PATENT DOCUMENTS

| | | | |
|---|---|---|---|
| DE | 41 43 140 | A1 | 7/1992 |
| DE | 43 42 455 | A1 | 12/1994 |
| DE | 44 21 950 | A1 | 6/1995 |
| DE | 198 37 288 | A1 | 2/2000 |
| DE | 100 07 253 | A1 | 8/2001 |
| EP | 1 154 075 | A2 | 11/2001 |
| JP | 09296410 | A | 11/1997 |
| JP | 10183525 | A | 7/1998 |

* cited by examiner

*Primary Examiner* — Raymond W Addie
(74) *Attorney, Agent, or Firm* — Pauley Petersen & Erickson

(57) ABSTRACT

A road milling machine having a milling roller with a plurality of chisels. A signal receiving unit is assigned to a machine component which is directly or indirectly involved in the milling process or to another machine component. The signal receiving unit detects an operating condition of the machine component and is connected to a signal emitting unit. An optical detecting device may be assigned to the road milling machine, whereby operations are made easier and the milling pattern is optimized.

21 Claims, 3 Drawing Sheets

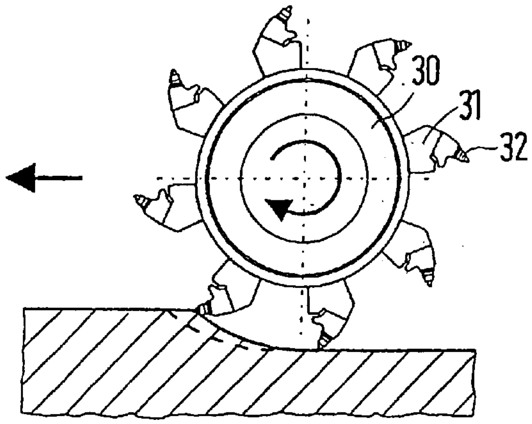
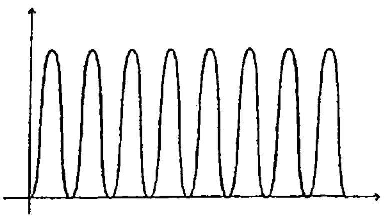
FIG. 4a
FIG. 4
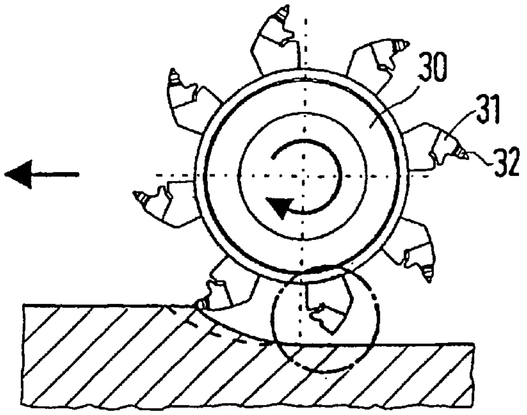
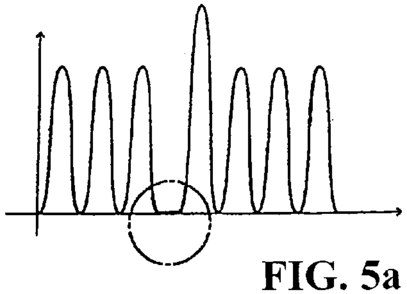
FIG. 5a
FIG. 5

ROAD MILLING MACHINE WITH OPTIMIZED OPERATION

CROSS REFERENCE TO RELATED APPLICATIONS

This application is a continuation of U.S. patent application Ser. No. 10/502,995, receiving a filing date of 18 May 2005, issued as U.S. Pat. No. 7,422,391 on 9 Sep. 2008, and which claims priority to International Patent Application PCT/EP02/11675 filed Oct. 18, 2002. The co-pending parent application is hereby incorporated by reference herein in its entirety and is made a part hereof, including but not limited to those portions which specifically appear hereinafter.

BACKGROUND OF THE INVENTION

1. Field of the Invention

This invention relates to a construction machine, in particular for working ground surfaces or for stripping traveled surfaces by a milling roller which has a multitude of chisels.

2. Discussion of Related Art

Construction machines are known, for example, as road milling machines. They have a milling roller equipped with a multitude of chisels, in particular round-shaft chisels. The milling roller rotates during operation and the chisels engage with the ground covering to be worked. The chisels are subjected to continuous wear and must be replaced after a defined time of operation. However, the service life of the chisels largely depends on the milling conditions. Often, the machine operator exchanges the chisels either too early or too late. If they are replaced too early, unnecessary tool expenses arise. If replaced too late, damage to the milling roller can occur.

A further problem in the milling process relates to premature chisel drop-out. One or several chisels can break because of external effects, or because of tool irregularities. Then, no material is removed at the places where the chisel is positioned. In addition, the stress on the adjoining tools increases and the tools are subjected to greater stresses.

Stabilizers, recyclers and trimmers are also known construction machines.

SUMMARY OF THE INVENTION

It is one object of this invention to provide a construction machine of the type mentioned above, by which an optimized working operation can be performed.

This object is achieved with a signal pickup unit that is assigned to a machine component, or another machine component which is directly or indirectly involved in the work process. The signal pickup unit detects an operational status of the machine component, and the signal pickup unit is connected to a signal output unit via a signal processing arrangement.

One or if required, several machine component can be monitored by the signal pickup unit. In the process, the operational status of the machine component is used as a parameter, or characteristic diagram. The detected parameters can be compared with a reference quantity or a reference quantity diagram. As soon as an inadmissible deviation occurs, a machine operator can perform the required corrective actions. The reference quantity, or the reference quantity diagram, can be a constant, which is stored in the evaluating unit, or is selected from a multitude of constants in a data bank of the evaluating unit on the basis of limiting conditions.

In an advantageous manner, the reference quantity and/or the reference quantity diagram can also be chronologically variable. For forming the reference values, the reference quantity and/or the reference quantity diagram can be determined empirically in a machine status wherein the tools are not worn out.

It is also possible that the reference quantity and/or the reference quantity diagram is recursively defined, such as is derived from the parameters and/or the characteristic diagram of the historical operational status.

The operational status of the monitored machine component can be determined either continuously or at predetermined measuring intervals.

For a better explanation, reference is made in what follows to a road milling machine. However, the explanations analogously apply to construction machinery of any type.

The evaluation of the measured result preferably occurs so that the signal picked up by the signal pickup unit is conducted to an evaluating unit. The evaluating unit compares the picked-up signal with a preset value and forms a difference signal from the picked-up signal and the preset value. It is thus possible to provide an error report which is automated to the greatest extent. Ideally, the preset value can be empirically determined by a detection circuit, and the preset value can be read into the evaluation circuit by the detection circuit. During this, the machine operator can determine the preset values during the milling process, for example with chisels which are not worn out.

In one embodiment of this invention, a machine chassis is supported by a running gear, wherein one or several drive motors are assigned to the running gear, and the signal pickup unit detects the power consumption of the drive motor. Use is made of the knowledge that changed wear conditions of the milling roller also lead to a change of the output parameters of the drive motor.

For example, an increased drive effort can be required because of increased wear of the chisel. With this embodiment of this invention, the drive motors are designed as electric motors, and the signal pickup unit detects the supplied electrical current or the drive motors are designed as hydraulic motors. The signal pickup unit detects the hydraulic pressure in the fluid circuit assigned to the drive motor.

In one embodiment of this invention, the machine chassis is supported, at least in some areas, by at least one adjustment device, and the machine chassis can be height-adjusted, at least in some areas, by the adjustment device. A fluid under pressure is assigned to the adjustment device, and the signal pickup unit detects the pressure in the fluid.

The forces occurring during milling are indirectly detected with this arrangement. The cutting forces are low for unworn cutting chisels which are ready to cut. The vertical portion of the cutting forces is directed opposite the force of gravity and therefore relieves the burden on the adjustment device, which otherwise would have to support the entire weight of the machine. The pressure in the fluid assigned to the adjustment device decreases proportionally with the vertical portion of the cutting forces. This value can also be determined by a force measurement, for example with a wire strain gauge, on at least one of the adjustment devices or another structural component.

It is also possible for the signal pickup unit to detect the forward progress of the machine which can then be compared with the actual output parameters of the road milling machine, in particular with the drive output required for the milling roller.

If, for example, at constant drive output the forward progress of the machine slows, then it is possible to draw conclusions regarding an increased wear status.

A combined calculation of the following values can also be performed: vertical force direction detected by the adjustment device, for example, and horizontal force direction detected by the drive data, for example. A vector can be formed by a linear combination and the length or directional change can be used as evaluation criteria.

In accordance with one embodiment of invention, the signal pickup unit detects the vibration of the machine component. This arrangement is based on different wear conditions that also have an effect on the vibration behavior of individual machine components. This design of a machine is based on the knowledge that a uniform vibration can be detected in view of the uniform rotatory movement of the milling roller. In the unworn state, this vibration has fixed parameters, including amplitude and period. As a result of a tool break, for example, the vibration undergoes a sudden change toward an irregular vibration, compared with the vibration prior to the break.

With uniformly proceeding wear, the amplitude of the parameters slowly changes in amount. Thus the irregularity or regularity of the signal is of lesser importance, or does not exist.

Thus it is preferably possible to detect the vibration by a displacement transducer, or a speed or an acceleration sensor.

Further invention embodiments can also be distinguished if the signal pick-up unit detects the drive moment at one or several places of a drive mechanism driving the milling roller, or if the signal pickup unit determines the motor parameters.

In one embodiment of this invention the signal pickup unit has a pulse generator assigned to the milling roller. A position determination of the milling roller can be performed by the pulse generator. If the signal detected by the signal pickup unit is processed together with the information from the pulse generator, it is possible to draw detailed conclusions regarding the position of a break-down point, for example a broken shaft.

One object of this invention is also achieved with a recognition unit that optically detects at least a portion of the milling pattern generated by the milling roller.

The quality of the milling pattern can be checked by the optical recognition unit, for example a camera. Errors due to the wear of the chisels or of a chisel break can be detected in the milling pattern. It is also possible to use a signal pickup unit designed in the manner described above in addition to the optical recognition unit. During this a further detailed error detection can take place.

In accordance with this invention, the recognition unit can have at least one position sensor which detects the milling depth.

BRIEF DESCRIPTION OF THE DRAWINGS

This invention is explained in greater detail in view of an exemplary embodiment represented in the drawings, wherein:

FIG. 4 shows the milling roller in accordance with FIG. 2, in a lateral view;

FIG. 4*a* shows a vibration image taken at a road milling machine equipped with a milling roller in accordance with FIG. 4;

FIG. 5 shows the milling roller in accordance with FIG. 3, in a lateral view; and FIG. 5*a* shows a vibration image taken at a road milling machine equipped with a milling roller, in accordance with FIG. 5.

DESCRIPTION OF PREFERRED EMBODIMENTS

Figure 1:
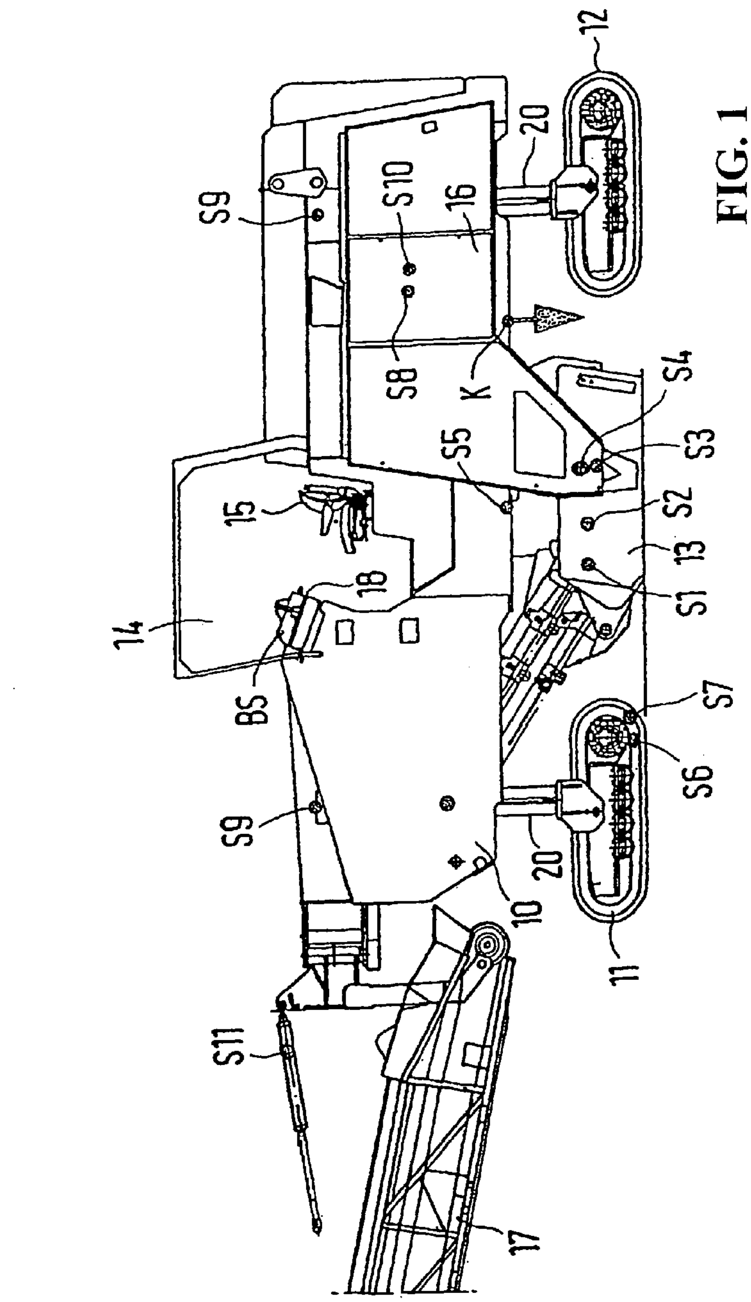
FIG. 1 is a lateral view of a construction machine, such as a road milling machine.

The lateral view of a road milling machine shows the basic structure and the components of the machine. A machine frame 10 is the basis for the machine, and is supported by two front running gears 11 and two rear running gears 12. In this case, the running gears 10 and 11 can be driven by electric motors or hydraulic motors. These drive mechanisms operate synchronously. It is thus sufficient to assign sensors S6 and S7 for detecting the electrical current or the pressure and the speed to only one running gear, for example 11.

A milling box 13 is attached to the machine frame 10 between the front and rear running gears 11 and 12. The milling box 13 contains at least one milling roller with chisel holders and chisels. The milling roller is driven by a drive unit 16, which has a Diesel engine, wherein a sensor S8 detects the transferred torque, and a sensor S10 detects other operating data, such as motor rpm, exhaust gas temperature, boost pressure, and the like.

A camera K is attached to the machine frame 10 between the milling box 13 and the rear running gear 12, by which the milling image is detected and recorded. The image is transferred to a video terminal BS in the cab 14 of the machine and is displayed. The driver seated on the driver's seat 15 can see the milling image on the video terminal BS arranged in the area of the dashboard 18 and can check its status and draw a conclusion regarding its quality. A continuous check can be performed if the camera K and the video terminal BS are switched on during the entire operating time of the machine. However, checking can be adjusted so that the devices and a display are switched on only when a request is initiated.

Sensors S2 and S4, which detect the position of the milling roller, the milling pressure and the milling torque, are attached to the milling box 13. A sensor S5 attached to the machine frame 10 above the milling box 13 detects the vibrations of the milling box 13 in the direction of travel, transversely to the direction of travel of the machine, and perpendicularly with respect to the pavement.

The machine frame 10 can be adjusted with respect to the running gears 11 and 12 via a height adjustment device in order to change the penetration depth of the milling roller in the pavement. The penetration depth is detected by the sensor S1. The pressure of the height adjustment device can be detected by the sensor S9.

The removed milling material is moved away from the milling box 13 by a conveyor device, wherein the conveyor device has an endless conveyor belt 17, one end of which is hinged to the machine frame 10 and which can, as shown by the sensors S11 and S12, be adjusted in height and laterally pivoted in order to assure a transfer to a vehicle arranged underneath, without damage to the vehicle and/or the endless conveyor belt 17.

The measured signals detected by the sensors S1 to S12 are also transmitted to the cab 14 and displayed in the area of the dashboard 18. In this case, individual display elements can be assigned to all sensors, which can be activated permanently or upon request. However, a central display device can be assigned to all sensors, on which the requested measured signal is displayed, wherein the display also contains the preset permissible range of the measured signals.

The measured signals can be continuously detected independently of the display, and compared with the preset value ranges. If the measured signals lie below or above the preset value ranges, a warning signal can be automatically triggered, and the error situation can be shown at the central display device.

Extensive wear of the chisels and other irregularities during operation result in large changes in the monitored operating data and are monitored, displayed and recognized by the driver of the road milling machine, which then can initiate steps for error location and error removal. This makes the operation by the road milling machine considerably easier and assures that components of the machine are not overloaded, damaged or even destroyed.

Figure 2:
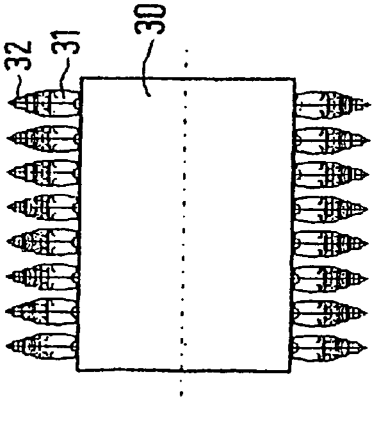
FIG. 2 is a schematic view of a milling roller, in a front view.
Figure 2A:
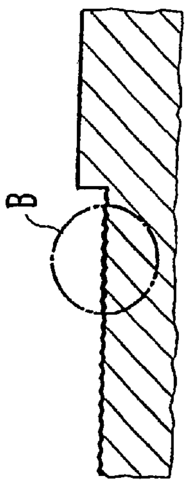
FIGS. 2*a* and 2*b* show the surface profile milled by the milling roller in accordance with FIG. 2, in a schematic representation.
Figure 2B:
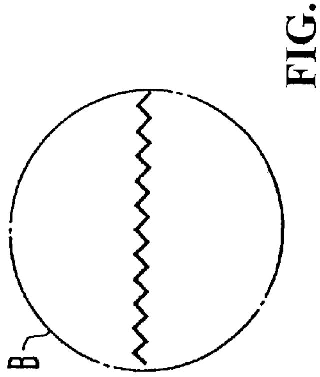
Figure 3:
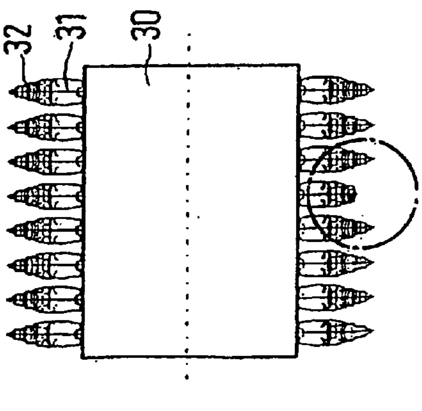
FIG. 3 shows a milling roller in accordance with FIG. 2, but with a defective place.
Figure 3A:
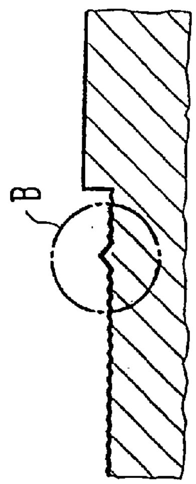
FIGS. 3*a* and 3*b* show the surface profile milled by the milling roller in accordance with FIG. 3 in a schematic representation.
Figure 3B:
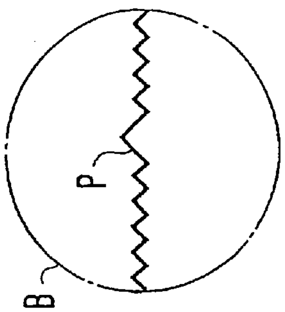

For explaining the optical milling image monitoring, a milling roller 30 is first shown in the unworn state (FIG. 2) in FIGS. 2 to 3*b*. As this representation shows, all chisel holders 31 are equipped with round-shaft chisels 32. The milling image A shown in FIGS. 2*a* and 2*b* results from such a milling roller 30.

If a chisel is lost from the milling roller 30, for example because of a tool break, the milling image B represented in FIGS. 3*a* and 3*b* results. It can be seen, in particular in the enlarged detailed view in accordance with FIG. 3*b* that at the place which was not worked because of the loss of the chisel raised material P remains in the pavement. This can be visually detected by a camera.

The milling rollers 30 of FIGS. 2 and 3 are shown, in a lateral view, in FIGS. 4 and 5. FIGS. 4*a* and 5*a* represent the vibration image recorded by an appropriate sensor.

What is claimed is:

1. A construction machine for working ground surfaces or for stripping traveled surfaces, the construction machine comprising:

- a machine frame supported by two front running gears and two rear running gears;
- a milling box attached to the machine frame between the front and rear running gears, the milling box containing at least one milling roller with chisel holders and chisels;
- a drive arrangement for driving the chisels;
- a signal pickup unit assigned to at least one machine component involved in a work process, wherein the signal pickup unit detects a drive torque as a signal at one or several locations of the drive arrangement, and
- the signal pickup unit is connected to a signal output unit via a signal processing arrangement;
- wherein the detected torque is compared to a preset signal range to ascertain a wear condition of the chisel.

2. The construction machine in accordance with claim 1, wherein the signal pickup unit detects the vibration of the machine component continuously or at preset measurement intervals.

3. The construction machine in accordance with claim 1, wherein the signal detected by the signal pickup unit is conducted to an evaluating unit, the evaluating unit compares the detected signal with a preset signal and forms a difference signal from the detected signal and the preset signal.

4. The construction machine in accordance with claim 3, wherein the preset signal is empirically determined by a detection circuit, and the preset signal is communicated to the evaluation circuit by the detection circuit.

5. The construction machine in accordance with claim 1, wherein a drive motor is assigned to the running gear, and the signal pickup unit further detects power consumption of the drive motor.

6. The construction machine in accordance with claim 5, wherein the drive motor comprises an electric motor, and the signal pickup unit detects a supplied electrical current of the drive motor, or the drive motor comprises a hydraulic motor, and the signal pickup unit detects hydraulic pressure in fluid circulation assigned to the drive motor.

7. The construction machine in accordance with claim 5, wherein the machine frame is supported, at least partially, by at least one adjustment device, the machine frame is height-adjustable, at least in some areas, by the adjustment device, a fluid under pressure is assigned to the adjustment device (20), and the signal pickup unit detects a pressure in the fluid.

8. The construction machine in accordance with claim 7, wherein a height adjustment of the adjustment device is determined by a force measurement.

9. The construction machine in accordance with claim 8, wherein the height adjustment of the adjustment device is determined by a wire strain gauge.

10. The construction machine in accordance with claim 1, wherein the signal pickup unit detects the forward progress of the machine.

11. The construction machine in accordance with claim 10, wherein for a position determination, the signal pickup unit comprises a pulse generator assigned to the milling roller.

12. The construction machine in accordance with claim 1, wherein the vibration is detected by a displacement transducer, a speed sensor or an acceleration sensor.

13. The construction machine in accordance with claim 1, wherein for a position determination, the signal pickup unit comprises a pulse generator assigned to the milling roller.

14. The construction machine in accordance with claim 1, wherein the signal pickup unit detects one or several motor parameters.

15. A construction machine for working ground surfaces or for stripping traveled surfaces, the construction machine comprising:

- a machine frame supported by two front running gears and two rear running gears;
- a milling box attached to the machine frame between the front and rear running gears, the milling box containing at least one milling roller with chisel holders and chisels;
- a signal pickup unit assigned to at least one machine component involved in a work process, wherein the signal pickup unit continuously or at preset measurement intervals detects a signal of vibrations of the machine component, the signal selected from an amplitude of the vibrations, a period of the vibrations, or a combination thereof, and
- an evaluating unit in combination with the signal pickup unit, wherein the evaluating unit monitors for a periodically occurring irregularity in the detected signal of vibrations by comparing the detected signal with a preset signal to ascertain a wear condition of the chisel.

16. The construction machine in accordance with claim 15, wherein the evaluating unit transmits a measured value to a display in a cab of the construction machine.

17. The construction machine in accordance with claim 15, wherein the preset value is empirically determined by means of a detection circuit, and the preset value is communicated to the evaluation circuit by the detection circuit.

18. The construction machine in accordance with claim 15, further comprising a machine frame supported by a running gear, wherein a drive motor is assigned to the running gear, the drive motor comprising an electric motor or a hydraulic motor.

19. The construction machine in accordance with claim 15, wherein the preset value is a previously detected parameter of the at least one machine component.

20. A construction machine for working ground surfaces or for stripping traveled surfaces, the construction machine comprising:

a machine frame supported by two front running gears and two rear running gears;

a milling box attached to the machine frame between the front and rear running gears, the milling box containing at least one milling roller with chisel holders and chisels;

a signal pickup unit assigned to at least one machine component involved in a work process, wherein the signal pickup unit detects vibrations of the machine component continuously or at a preset measurement intervals, and the signal pickup unit is connected to a signal output unit via a signal processing arrangement;

wherein the signal output unit monitors for a change including a periodically occurring irregularity in the amplitude or period of the vibrations, and the irregularity is determined by comparing the detected vibrations to a preset signal to ascertain a wear condition of the chisel.

21. The construction machine in accordance with claim 20, wherein the preset value is at least one of an amplitude or a period of a previously detected vibration of the at least one machine component.

* * * * *